Nov. 8, 1955  J. STEC  2,722,836
TIRE PRESSURE GAUGE
Filed April 23, 1953  2 Sheets-Sheet 1

Joseph Stec
INVENTOR.

Nov. 8, 1955  J. STEC  2,722,836
TIRE PRESSURE GAUGE
Filed April 23, 1953  2 Sheets-Sheet 2
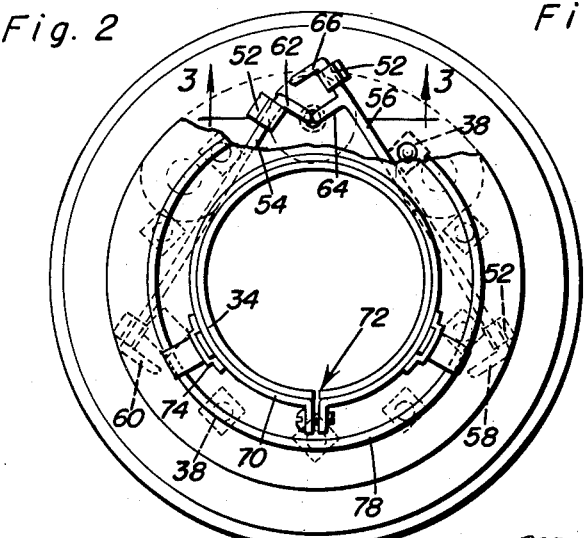
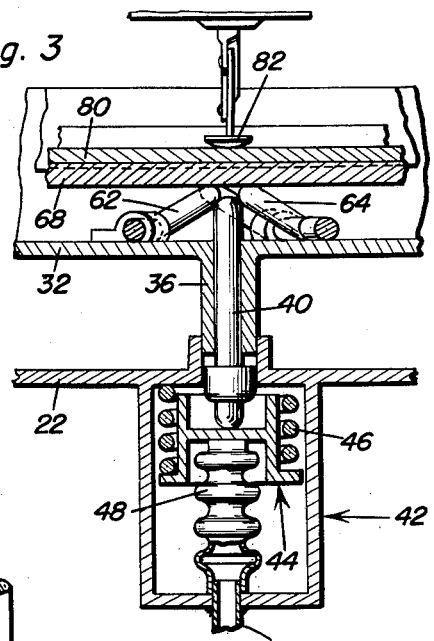
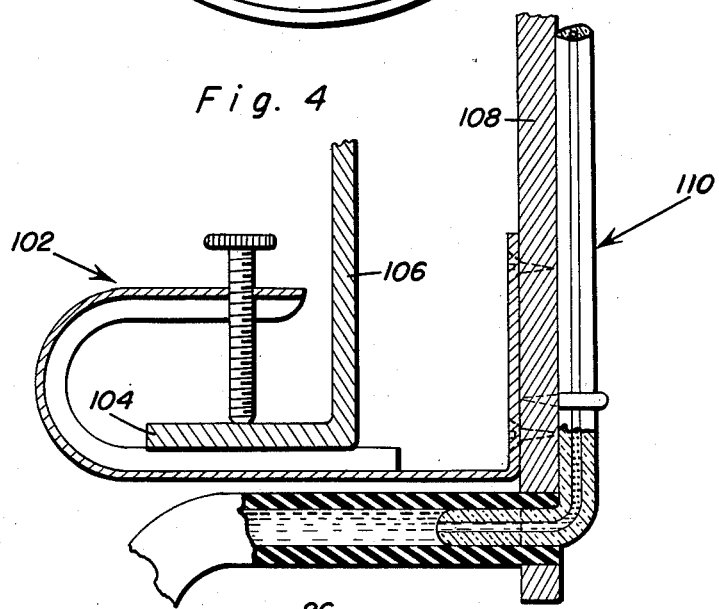
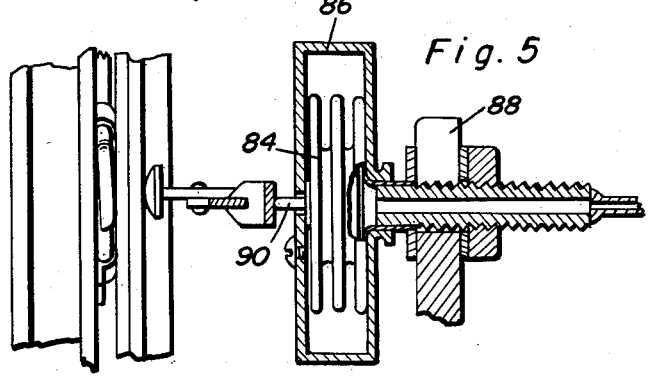
Joseph Stec
INVENTOR.

2,722,836

TIRE PRESSURE GAUGE

Joseph Stec, Edmonton, Alberta, Canada

Application April 23, 1953, Serial No. 350,650

6 Claims. (Cl. 73—390)

This invention relates to improvements in mechanism for continuously indicating the condition of pressure existing in a vehicle tire.

The primary object of this invention is to provide an improved form of tire pressure indicating gauge which incorporates a novel combination of elements to positively and accurately indicate at all times the pressure existing within a pneumatic vehicle tire.

Another object of this invention is to provide an improved tire pressure gauge mechanism which incorporates a minimum of component parts resulting in a simple yet effective mechanism and one which lends itself readily to mass production.

Another object of this invention is to provide an improved tire pressure gauge mechanism which incorporates novel mechanical mechanism which will accurately transcribe pressure variations within a vehicle tire into mechanical movements which operate upon an indicating plate which, in turn, converts the mechanical movement into a pressure component which will accurately indicate the pressure existing within the pneumatic tire.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 2 is an elevational view showing a portion of the novel gauge mechanism;

Figure 3 is a horizontal section taken substantially along the plane of section line 3—3 of Figure 2 showing details of the tire pressure gauge on an enlarged scale;

Figure 4 is an enlarged view showing the pressure indicating gauge mounted on a vehicle dashboard; and Figure 5 is a horizontal section taken substantially along the plane of section line 5—5 of Figure 1 showing details of the pressure gauge mechanism on an enlarged scale.

Figure 1:
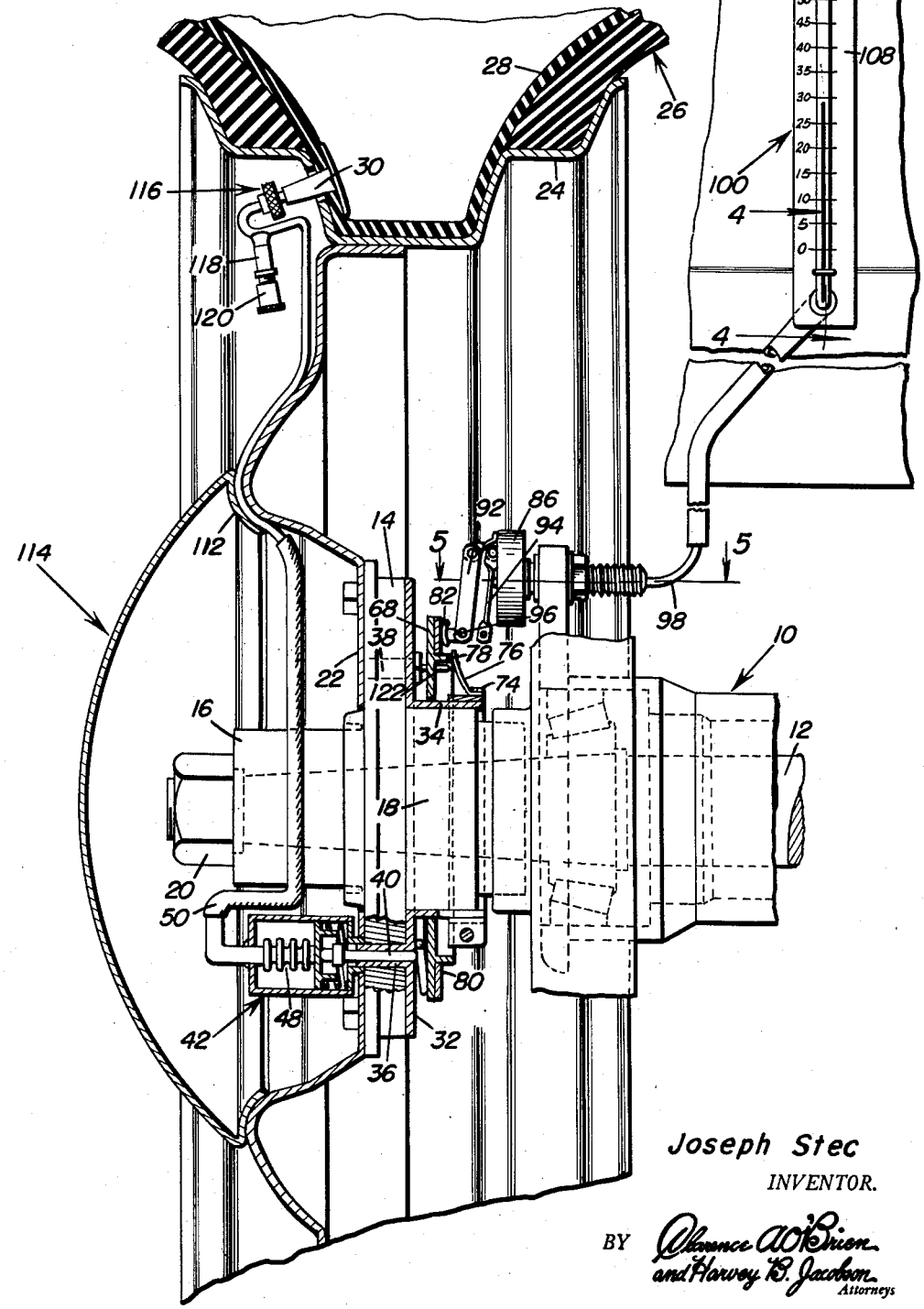
Figure 1 is an enlarged vertical section of a vehicle wheel assembly incorporating the novel tire pressure gauge.

Referring now more particularly to Figure 1, reference numeral 10 indicates generally an axle housing which encloses the axle 12 which extends outwardly from the housing in a conically tapered portion as is well known in the art. For the sake of clarity, reference numeral 14 indicates in a diagrammatic manner the center portion of a brake drum for the vehicle wheel which includes the central outer hub portion 16 and the central inner hub portion 18, as is conventional. The brake drum is maintained on the axle by virtue of a conical taper in its hub portion, the nut 20 being provided on the threaded end of the axle for maintaining the drum in place. Mounting flange 22 of a vehicle wheel is suitably secured by any conventional means to the outer face of the brake drum and this wheel includes the circumferential rim 24 upon which a conventional pneumatic tire casing 26 is mounted, the tire including an inner tube 28 having a conventional valve stem 30.

The above described assembly is conventional in nature and forms no part of this invention although description of the same is necessary for proper understanding of the invention.

A pressure plate 32 is provided with a central sleeve portion 34 which is engaged upon the inner hub 18 of the brake drum and is secured for rotation therewith by the lateral projections 36 and 38 which extend through the main portion of the brake drum as shown. The projection 36 is longitudinally bored and slidably receives therethrough an actuating plunger 40.

Referring now more particularly to Figure 3, it will be seen that the mounting flange 22 of the vehicle wheel is provided with an integral cylinder assembly 42 which reciprocably receives a piston member 44 urged by the spring 46 away from the mounting flange. The piston is pressure connected to the bellows 48 and the pressure line 50 to the previously mentioned inner tube and is continuously indicative of the pressure condition within such inner tube, the operation being such that the higher the pressure within the inner tube the more the bellows mechanism is extended to force the piston within the cylinder toward the mounting flange.

With more particular reference now to Figure 2 as well as Figure 3, it will be seen that the pressure plate 32 is provided with a plurality of brackets 52 which pivotally receive a pair of mutually convergent members 54 and 56. These rod members are disposed in parallel relationship with the inner face of the pressure plate and are provided with laterally bent end portions 58, 60, 62, 64 and 66. The two laterally bent ends 62 and 64 are directed in such a manner as their free ends are disposed in closely adjacent positions and these free ends are in register with the actuating plunger 40 so that movement of the latter will effect pivotal motion of the lever rods 54 and 56. The remaining laterally bent end portion of the rod levers in addition to the ends 62 and 64 will swing in unison away from the pressure plate 32 to impart a uniformly spaced movement to an indicating plate member 68 of annular configuration which is disposed concentrically of the sleeve portion 34 of the pressure plate assembly.

A clamping band 70 frictionally engages about the outer surface of the sleeve 34 and this sleeve, being longitudinally split as at 72, will be snugly engaged upon the hub portion 18. The clamping member is provided with brackets 74 which receive one end of the resilient spring fingers 76 whose opposite ends bear against a sleeve portion 78 on the actuating plate serving to normally urge the actuating plate in a direction toward the pressure plate 32. The inner surface of the actuating plate may be provided with suitable bearing facing material 80 so that the friction between the bearing material and the pressure head 82 will be at a minimum.

Referring now more particularly to Figure 5, it will be seen that a bellows 84 is enclosed within the casing 86 which is, in turn, suitably secured to a projecting ear 88 provided on the axle housing 10 and this bellows includes an operating plunger 90 which projects outwardly of the housing 86. The housing is provided with gears which pivotally receive a pair of parallel legs 92 and 94 the latter of which bears against the plunger 90 and the free ends of these levers are provided with a connecting link 96 which terminates in its free end in the previously mentioned pressure head 82 in engagement with the actuating plate bearing member 80. The interior of the bellows 84 is pressure connected through the line 98 with a pressure gauge 100 mounted on the vehicle dash and suitably calibrated to indicate the pressure existing within the inner tube of the tire. A clamping element 102 may be utilized in securing the gauge to a lip 104 of the vehicle dash 106. The bellows is filled with suitable colored liquid which, when forced into the bore of the indicating gauge will suitably show up against the back plate 108 of the gauge so as to be easily read.

The pressure line 50 extending from the cylinder bellows 48 extends within the securing lug well of the vehicle wheel and progresses outwardly therefrom through an indentation 112 in the hub 114 which presents a slot therethrough so that the line may continue into engagement with the valve stem 30 through a suitable coupling means 116. In order to allow air to be introduced into the inner tube without disconnecting the pressure line 50 therefrom, a secondary valve stem 118 is provided in the pressure line, this mechanism including the usual valve cap 120.

In order to suitably guide the actuating plate 68 with respect to the pressure plate 32, the various securing projections 38 are provided with laterally projecting guide pin elements 122 which extend through corresponding apertures in the actuating plate 68 so that the same is guided thereby.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. A tire pressure indicator for vehicle wheel assemblies which include an axle housing enclosing an axle, a brake drum secured to the axle and a wheel carried by the drum, said indicator comprising a cylinder carried by the wheel, a piston reciprocably received in said cylinder and having an actuating plunger extending therefrom through said drum, a plate member movably carried by said drum, lever means secured to the drum having portions engageable by said actuating plunger and movable in response to motion of the plunger to impart movement to the plate, means including mechanism secured to said axle housing for indicating movement of said plate, spring means normally urging said plunger away from said plate, said cylinder being pressure connected to a pneumatic tire mounted on the wheel, said plate member being of annular configuration and disposed concentrically of said axle, guide pins projecting from said drum through said plate guiding the latter for movement toward and away from said drum, said lever means being disposed between said drum and said plate and comprising a pair of converging rods pivotally secured to said drum, said rods having laterally bent end portions, the end portions at the converging ends of the rods being engageable by said actuating plunger and all of said end portions being in engagement with said plate for imparting uniformly spaced movement of said plate with respect to said drum.

2. A tire pressure indicator for vehicle wheel assemblies which include an axle housing enclosing an axle, a brake drum secured to the axle and a wheel carried by the drum, said indicator comprising a cylinder carried by the wheel, a piston reciprocably received in said cylinder and having an actuating plunger extending therefrom through said drum, a plate member movably carried by said drum, lever means secured to the drum having portions engageable by said actuating plunger and movable in response to motion of the plunger to impart movement to the plate, means including mechanism secured to said axle housing for indicating movement of said plate, spring means normally urging said plunger away from said plate, said cylinder being pressure connected to a pneumatic tire mounted on the wheel, said plate member being of annular configuration and disposed concentrically of said axle, guide pins projecting from said drum through said plate guiding the latter for movement toward and away from said drum, said lever means being disposed between said drum and said plate and comprising a pair of converging rods pivotally secured to said drum, said rods having laterally bent end portions, the end portions at the converging ends of the rods being engageable by said actuating plunger and all of said end portions being in egagement with said plate for imparting uniformly spaced movement of said plate with respect to said drum, said last means including a bellows mechanism having an operating lever engaging said plate, and an indicating instrument pressure connected with said bellows for indicating the position of said plate.

3. A tire pressure indicator for vehicle wheel assemblies which include an axle housing enclosing an axle, a brake drum secured to the axle and a wheel carried by the drum, said indicator comprising a cylinder carried by the wheel, a piston reciprocably received in said cylinder and having an actuating plunger extending therefrom through said drum, a plate member movably carried by said drum, lever means secured to the drum having portions engageable by said actuating plunger and further portions engaging said plate member at spaced locations thereon to impart uniform movement to the plate, means including mechanism secured to said axle housing for indicating movement of said plate, spring means normally urging said plunger away from said plate, said cylinder being pressure connected to a pneumatic tire mounted on the wheel.

4. A tire pressure indicator for vehicle wheel assemblies which include an axle housing enclosing an axle, a brake drum secured to the axle and a wheel carried by the drum, said indicator comprising a cylinder carrried by the wheel, a piston reciprocably received in said cylinder and having an actuating plunger extending therefrom through said drum, a plate member movably carried by said drum, lever means secured to the drum having portions engageable by said actuating plunger and further portions engaging said plate member at spaced locations thereon to impart uniform movement to the plate, means including mechanism secured to said axle housing for indicating movement of said plate, spring means normally urging said plunger away from said plate, said cylinder being pressure connected to a pneumatic tire mounted on the wheel, said plate member being of annular configuration and disposed concentrically of said axle, guide pins projecting from said drum through said plate guiding the latter for movement toward and away from said drum.

5. A tire pressure indicator for vehicle wheel assemblies which include an axle housing enclosing an axle, a brake drum secured to the axle and a wheel carried by the drum, said indicator comprising a cylinder carried by the wheel, a piston reciprocably received in said cylinder and having an actuating plunger extending therefrom through said drum, a plate member movably carried by said drum, lever means secured to the drum having portions engageable by said actuating plunger and further portions engaging said plate member at spaced locations thereon to impart uniform movement to the plate member, means including mechanism secured to said axle housing for indicating movement of said plate, spring means normally urging said plunger away from said plate, said cylinder being pressure connected to a pneumatic tire mounted on the wheel, said plate member being of annular configuration and disposed concentrically of said axle, guide pins projecting from said drum through said plate guiding the latter for movement toward and away from said drum, spring fingers carried by the drum engaging said plate for normally urging the latter toward the drum.

6. A tire pressure indicator for vehicle wheel assemblies which includes an axle housing enclosing an axle, a brake drum secured to the axle and a wheel carried by the drum, said indicator comprising a cylinder carried by the wheel, a piston reciprocably received in said cylinder and having an actuating plunger extending therefrom through said drum, a plate member movably carried by said drum, lever means secured to the drum having portions engageable by said actuating plunger and further portions engaging said plate member at spaced locations thereon to impart uniform movement to the plate member, means including mechanism secured to said axle housing for indicating movement of said plate, spring means normally urging said plunger away from said plate, said cylinder being pressure connected to a pneumatic tire mounted on the wheel, said last means including a bellows mechanism having an operating lever engaging said plate, and an indicating instrument pressure connected with said bellows for indicating the position of said plate.

References Cited in the file of this patent

UNITED STATES PATENTS

| | | |
|---|---|---|
| 2,353,428 | Akin | July 11, 1944 |
| 2,481,534 | Robertson | Sept. 13, 1949 |
| 2,552,068 | Steven | May 8, 1951 |